United States Patent [19]

Nakanishi

[11] Patent Number: 4,883,370
[45] Date of Patent: Nov. 28, 1989

[54] ROTARY STRUCTURE

[75] Inventor: Tsutomu Nakanishi, Tokyo, Japan

[73] Assignee: C.S.U. Ltd., Tokyo, Japan

[21] Appl. No.: 7,336

[22] Filed: Jan. 27, 1987

[30] Foreign Application Priority Data

Jan. 28, 1986 [JP] Japan .............................. 61-11391[U]

[51] Int. Cl.[4] .............................................. F16C 43/06
[52] U.S. Cl. .................................... 384/490; 384/537
[58] Field of Search ................ 384/488, 490, 495–497, 384/500, 504, 505, 510, 512, 513, 516, 517–519, 537, 540, 511; 29/149.5 R, 148.4 A, 148.4 R, 148.4 B

[56] References Cited

U.S. PATENT DOCUMENTS

| | | | |
|---|---|---|---|
| 1,321,417 | 11/1919 | Carlborg et al. | 384/497 |
| 2,011,192 | 8/1935 | Comstock | 384/488 |
| 2,433,518 | 12/1947 | Ljunggren | 384/517 |
| 2,502,874 | 4/1950 | Moore | 384/517 |
| 2,588,459 | 3/1952 | Annen | 384/513 X |
| 2,704,695 | 3/1955 | Ricefield | 384/497 |
| 2,719,765 | 10/1955 | Menne | 384/516 |
| 3,492,711 | 2/1970 | von Fraunberg | 384/511 X |
| 3,578,829 | 5/1971 | Hata et al. | 384/518 X |
| 3,639,019 | 2/1972 | Schaeffler | 384/537 |
| 3,940,192 | 2/1976 | Hägele | 384/517 |
| 3,994,544 | 11/1976 | Flatland | 384/488 |
| 4,325,590 | 4/1982 | Pethis | 384/518 |
| 4,508,397 | 4/1985 | Hofmann et al. | 384/510 |
| 4,577,980 | 3/1986 | Weichenrieder | 384/488 |
| 4,606,655 | 8/1986 | Hofmann | 384/510 X |

FOREIGN PATENT DOCUMENTS

| | | | |
|---|---|---|---|
| 287213 | 9/1915 | Fed. Rep. of Germany | 384/517 |
| 3101596 | 8/1982 | Fed. Rep. of Germany | 384/517 |
| 69320 | 4/1985 | Japan | 384/490 |

*Primary Examiner*—Thomas R. Hannon
*Attorney, Agent, or Firm*—Roberts, Spiecens & Cohen

[57] ABSTRACT

A rotary structure adapted to be used as a spindle unit for a miniature motor or miniature rotor or as a tape guide roller for a VTR. In the structure of the rotary mechanism, instead of a conventional expensive radial ball bearing, a groove of a semicircular cross-section is formed in a shaft itself so as to hold balls between this groove and the ball receiving concave surface of an outer race provided around the groove.

4 Claims, 13 Drawing Sheets

FIG.12 ① 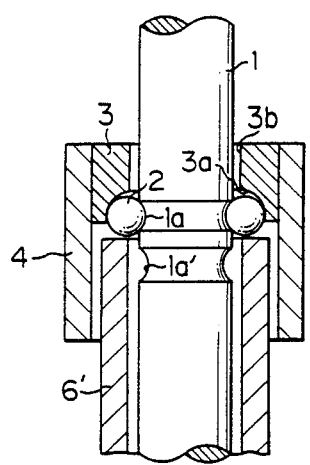
FIG.12 ③ 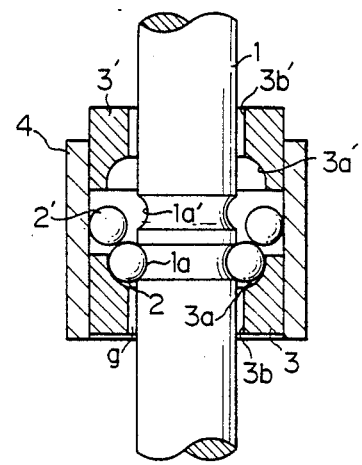
FIG.12 ② 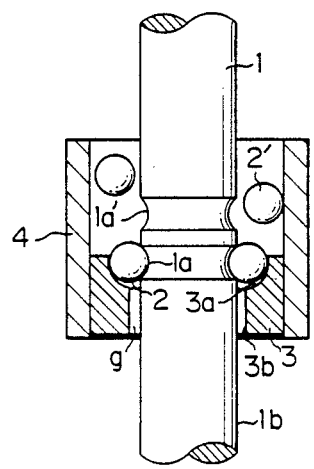
FIG.12 ④ 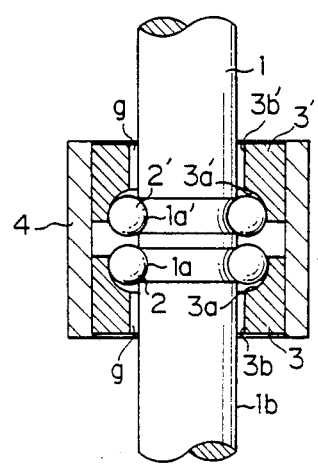

FIG.19 ① 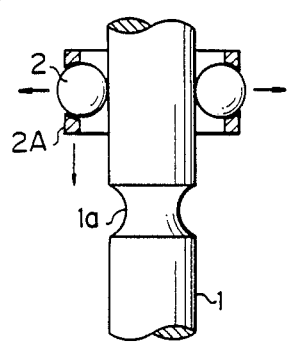
FIG.19 ② 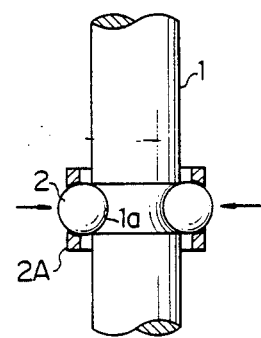

FIG.21① FIG.21② FIG.21③
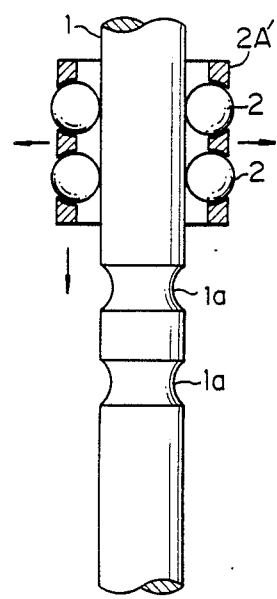
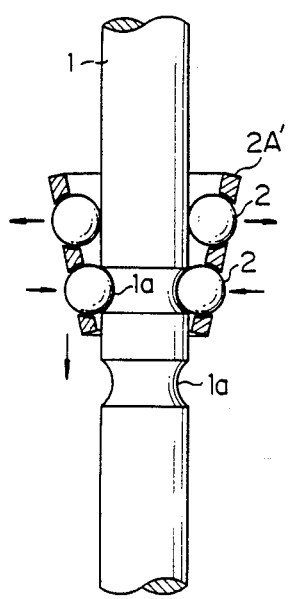
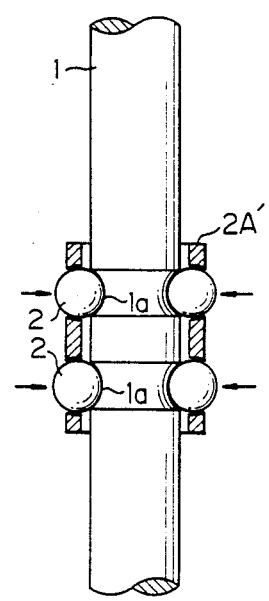

4,883,370

ROTARY STRUCTURE

BACKGROUND OF THE INVENTION:

A spindle unit used for a miniature motor or miniature rotor has been conventionally formed as shown in FIG. 22.

That is to say, a pair of radial ball bearings 21 and 22 are arranged in the upper and lower parts of the outer periphery of a shaft 20, a cylindrical spacer 23 is arranged between the outer races 21a and 22a of these radial ball bearings 21 and 22 to position the radial ball bearings 21 and 22 with respect to each other, these are fixed within the bore H of a bearing housing 24, a rotor 25 such as a pulley, disc or turntable is fixed to the end of the shaft 20 and the shaft 20 is rotated from the other end.

The rotary mechanism of a conventional tape guide roller has been formed substantially the same.

However, in the above mentioned construction, in order to prevent dust or the like from entering the radial ball bearings 21 and 22 and reducing the performance, a so-called double sealing structure is used in which sealing members S are arranged on both sides of balls 21c or 22c within each of the radial ball bearings 21 and 22.

This construction has the disadvantage that the radial ball bearings 21 and 22 have many component parts, are complicated to assemble and are high in cost. Also, because of the clearances (in four places) of the radial ball bearings 21 and 22 the shaft 20 can tilt during rotation.

SUMMARY OF THE INVENTION:

This invention seeks to overcome the above mentioned deficiencies and has it as an object to provide a rotary structure wherein the construction of radial ball bearing parts is simplified and manufacture and assembly are made easy and the cost is reduced.

Another object of the present invention is to provide a rotary structure wherein the inner race and shaft are made integral so as to be small and light, enabling the ball diameter to be larger and to improve the rigidity.

Further, another object of the present invention is to provide a rotary structure wherein, by finely adjusting the position of the outer race in assembling, the clearance can be easily adjusted and the precision can be improved.

BRIEF DESCRIPTION OF THE DRAWINGS:

FIG. 12(1) to (4) are explanatory views showing the twelfth embodiment of the present invention as it is being assembled.

FIGS. 19(1) and (2) are explanatory views showing the fifteenth embodiment as it is being assembled.

FIGS. 21(1) to (3) are explanatory views showing the sixteenth embodiment as it is being assembled.

Figure 1:
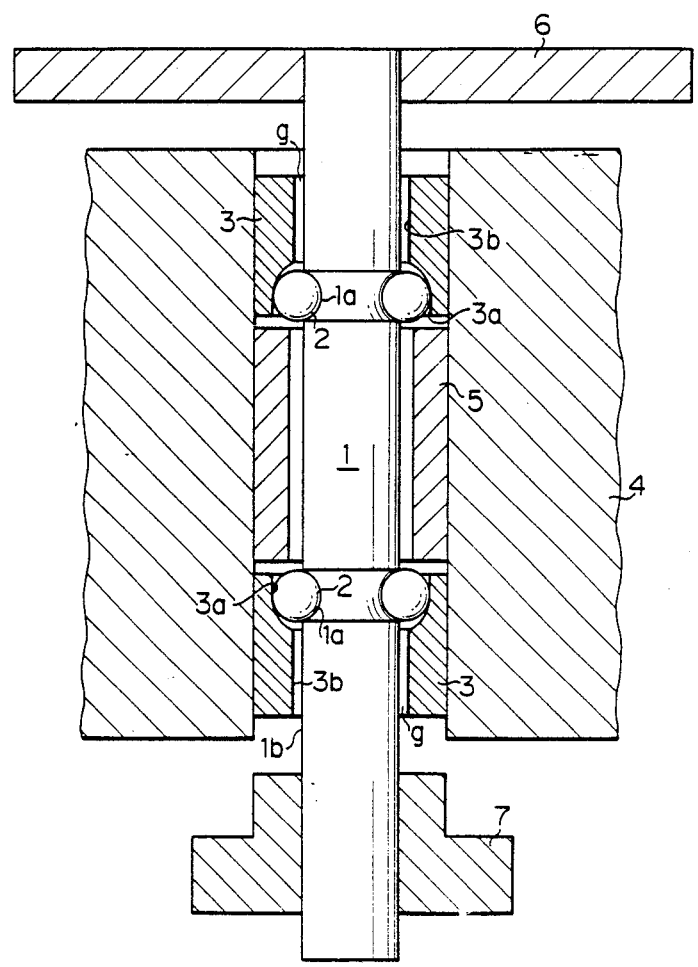
FIG. 1 is a schematic vertically sectional view of the first embodiment of the present invention.

DESCRIPTION OF THE PREFERRED EMBODIMENTS:

In FIG. 1 showing the first embodiment of the present invention, grooves 1a of a semicircular cross-section for receiving balls 2 are formed as separated from each other respectively in the upper part and lower part in the outer periphery of a columnar shaft 1 by cutting or grinding around the entire periphery and a proper number of balls 2 are rotatably received in each of these grooves 1a. The respective balls 2 are rotatably borne by substantially cylindrical outer races 3 provided around the outer periphery of the shaft 1. That is to say, a concave receiving surface 3a of part circular cross-section with a radius of curvature somewhat larger than that of the groove 1a is formed at the inner end of the outer race 3 and the balls 2 are provided between this ball receiving surface 3a and the groove 1a. The outer peripheral surface 1b of the shaft 1 and the inner peripheral surface 3a of the outer race 3 opposed thereto are not in contact with each other and form a dust preventing clearance g. A cylindrical sleeve 5 is provided between the pair of outer races 3. This sleeve 5 serves to prevent the balls 2 from dropping during assembly, is fixed to the inner peripheral surface of a bearing housing 4, has its respective outer ends positioned near the balls 2 and is not in contact with the outer races 3, balls 2 and shaft 1. The sleeve 5 could be attached to the shaft 1 instead of the housing 4. The respective outer races 3 are fixed to the inner peripheral surface of the bearing housing 4.

In case this assembly is to be used for a miniature motor or miniature rotor, a pulley 7 may be provided at the lower end of the shaft and a rotor 6 such as a pulley, disc, turntable or drum may be provided at the upper end of the shaft 1 to form a rotary structure.

In assembling, first of all, the sleeve 5 is fixed as by press fit substantially in the middle of the bore in the bearing housing 4 and the shaft 1 is inserted into the sleeve 5. Then a proper number of balls 2 on the upper or lower side are put into the corresponding ball receiving groove 1a and grease or oil is poured into that part. Then, the outer race 3 to be positioned on the opening side of the hole is put into the bore in the bearing housing 4 from the opening to press the balls 2 by the ball receiving surface 3a and the race is fixed in a proper position on the inner peripheral surface of the bearing housing 4. Then, the balls 2 and outer race 3 on the other side may be put in in the same manner and, as required, the upper rotor 6 and lower pulley 7 may be fixed to the respective ends of the shaft 1.

In the above mentioned assembling step, before the upper rotor 6 and lower pulley 7 are fixed, the rotating precision of the bearing housing 4 can be confirmed and, by finely adjusting the position of the outer race 3, the clearance of the balls 2 can be easily adjusted and a favorable rotation performance can be obtained.

The inner peripheral surface 3b of the outer race 3 is so close to the outer peripheral surface 1b of the shaft 1 that, by the clearance g of this fine gap, the entry of dust or the like into the ball part can be minimized.

Figure 2:
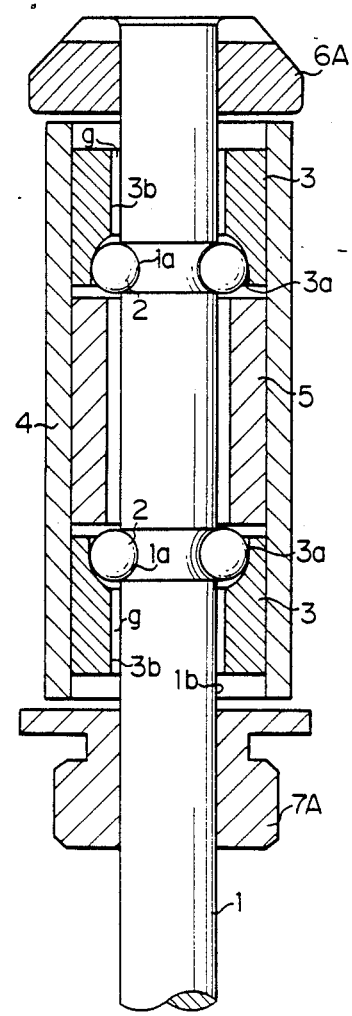
FIG. 2 is a similar view of the second embodiment of the present invention.

FIG. 2 is of the second embodiment of the present invention. This embodiment is different from the first embodiment in that the shaft 1 is fixed and the bearing housing 4 is formed as a cylindrical member and is made rotatable so as to be able to be used, for example, as a tape guide roller. By the way, flanges 6A and 7A are provided respectively in the upper part and lower part of the shaft 1. The other construction is the same as in the first embodiment, and therefore, the same members are represented by the same reference numerals and no detailed explanation shall be made.

Figure 3:
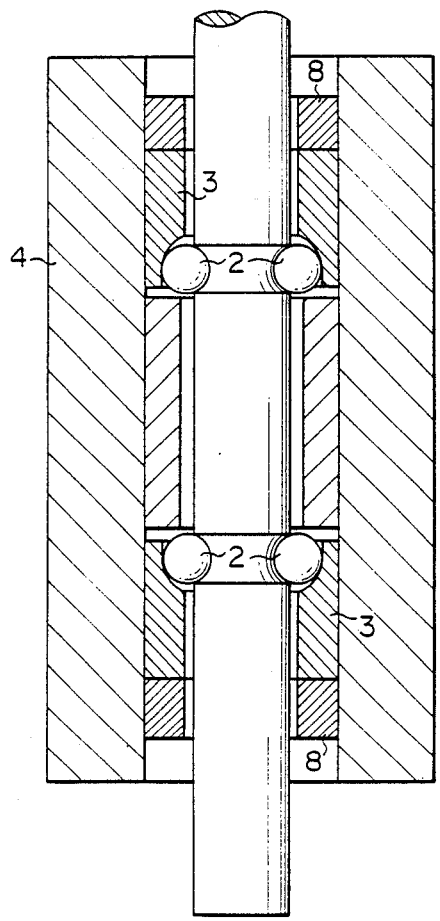
FIG. 3 is a similar view of the third embodiment of the present invention.

FIG. 3 shows the third embodiment of the present invention. In this embodiment the outer race 3 is not fixed but is slidable on the inner peripheral surface of the bearing housing 4 and is fixed by an outer race presser 8 provided outside the outer race 3 and fixed to the inner peripheral surface of the bearing housing 4 and, in such case, both or either one of the upper and lower outer race pressers 8 is made of an elastic member such as rubber so as to apply a pre-pressure to the outer race 3 in contact with the balls 2 and to prevent a backlash from being caused upon abrasion of the ball rolling surface.

The other construction is the same as in the first and second embodiments.

Figure 4:
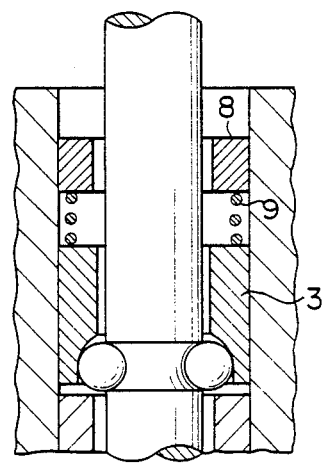
FIG. 4 is a similar view of the fourth embodiment of the present invention.

FIG. 4 shows the fourth embodiment of the present invention. In this embodiment, a resilient member such as a spring 9 is provided between the outer race 3 and outer race presser 8 so as to apply a pre-pressure to the outer race 3.

Figure 5:
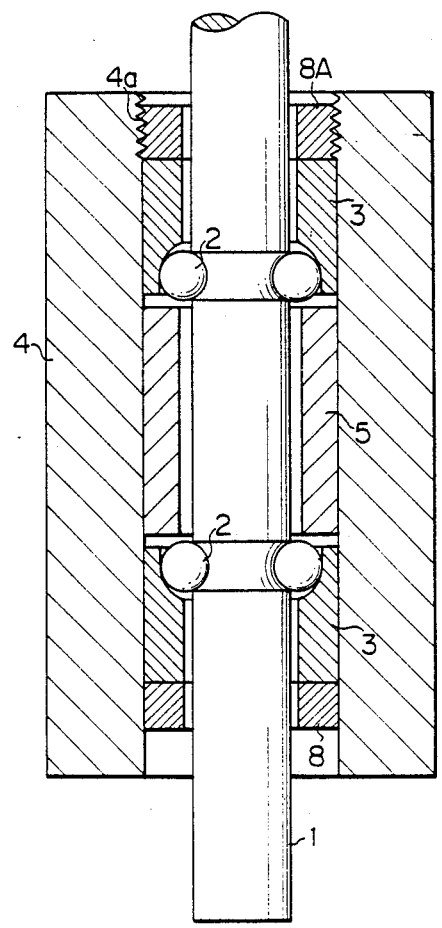
FIG. 5 is a similar view of the fifth embodiment of the present invention.

FIG. 5 shows the fifth embodiment of the present invention. In this embodiment, either one of the outer race pressers is made as an outer race adjusting screw 8A engaging threads 4a formed on the inner peripheral surface of the bearing housing 4 so that the position of the outer race 3 may be adjusted by the outer race adjusting screw 8A for adjusting the clearance between the balls 2 and outer race 3. The other outer race presser 8 is to be fixed by the bearing housing 4.

Figure 6:
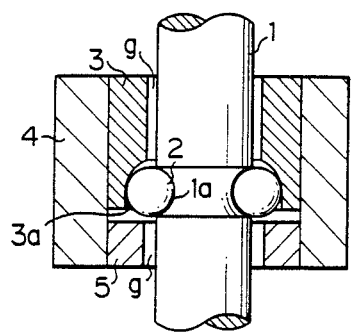
FIG. 6 is a similar view of the sixth embodiment of the present invention.

FIG. 6 shows the sixth embodiment of the present invention. In the first to fifth embodiments, two ball parts are provided but, in the subsequent embodiments, one ball part is provided only on one side.

That is to say, a groove 1a is formed on the outer periphery of the columnar shaft 1 and the balls 2 are held in this groove 1a by a ball receiving surface 3a of the outer race 3 fixed to the inner peripheral surface of the bearing housing 4. A short cylindrical sleeve 5 fixed to the inner peripheral surface of the bearing housing 4 is provided near the balls 2 and the ball receiving surface 3a of the outer race 3. A dust preventing clearance g is formed between the inner peripheral surfaces of the outer race 3 and sleeve 5 and the outer peripheral surface of the shaft 1.

In assembling, the sleeve 5 is fixed within the bearing housing 4, then the shaft 1 is inserted into the sleeve 5 and a proper number of balls 2 are put in from the other side and are positioned within the groove 1a. In such case, the balls 2 are prevented from following by the sleeve 5. Then, the outer race 3 is put into the bearing housing 4 and fixed in a proper position. The other part of the shaft 1 may be borne by an ordinary radial ball bearing, plane bearing or pivot bearing.

Figure 7:
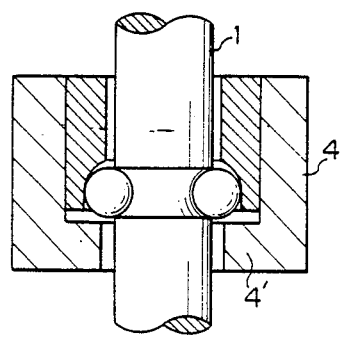
FIG. 7 is a similar view of the seventh embodiment of the present invention.

FIG. 7 shows the seventh embodiment of the present invention. This embodiment is different from the sixth embodiment in that a sleeve 4' extending toward the shaft 1 is integrally formed on the inner peripheral surface of the end part of the bearing housing 4. The other construction is the same.

Figure 8:
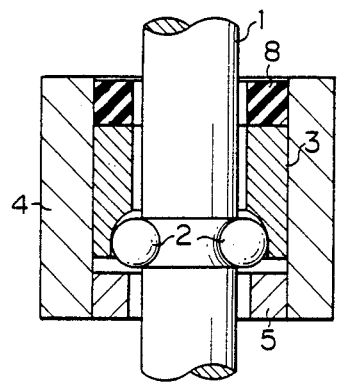
FIG. 8 is a similar view of the eighth embodiment of the present invention.

FIG. 8 shows the eighth embodiment of the present invention. In this embodiment, the outer race 3 in the sixth embodiment is loosely fitted within the bearing housing 4 and is fixed by the outer race presser 8 made of an elastic material and arranged outside the outer race 3 so as to apply a pre-pressure by the elasticity of the outer race presser 8 and to prevent a backlash from being caused upon abrasion of the ball rolling surfaces The other construction is the same as in the sixth embodiment.

Figure 9:
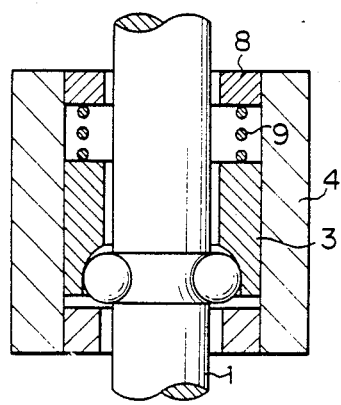
FIG. 9 is a similar view of the ninth embodiment of the present invention.

FIG. 9 shows the ninth embodiment of the present invention. This embodiment is different from the eighth embodiment in that the outer end of the outer race 3 loosely fitted within the bearing housing 4 and the inner end of the outer race presser 8 fixed within the bearing housing 4 are separated from each other and a resilient member 9 such as a spring is interposed between them so as to apply a pre-pressure to the outer race 3. In such case, the outer race presser 8 is not specifically required to be an elastic member.

Figure 10:
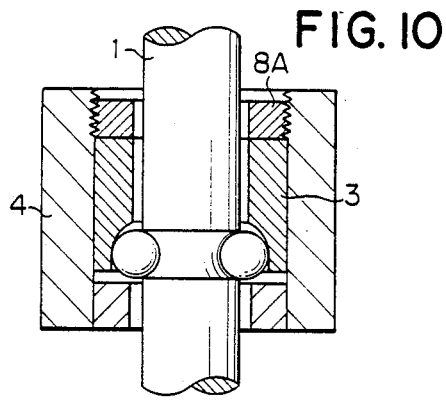
FIG. 10 is a similar view of the tenth embodiment of the present invention.

FIG. 10 is of the tenth embodiment of the present invention. In this embodiment, the outer race adjusting screw 8A is provided outside the outer race 3 and is threaded in the inner peripheral surface of the bearing housing 4 so as to make it possible to adjust the clearance.

Figure 11:
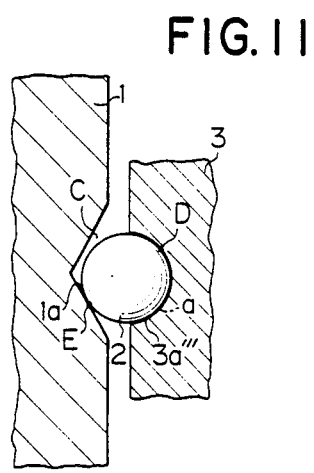
FIG. 11 is a similar view of the eleventh embodiment of the present invention.
Figure 13A:
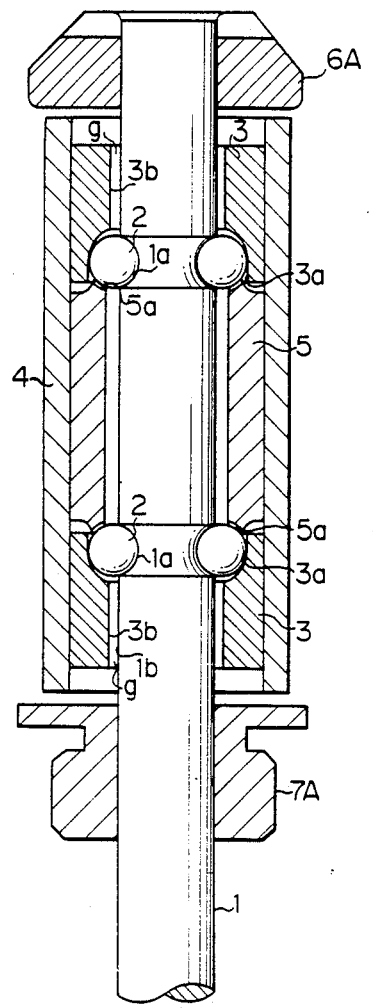
FIG. 13(a) is of similar view of the thirteenth embodiment of the present invention and FIG. 13(b) is an explanatory plan view showing balls as held at intervals by a sleeve.
Figure 13B:
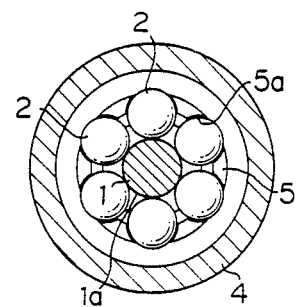

FIG. 11 shows the eleventh embodiment of the present invention. In case the ball receiving concave part 3a shown in the above described respective drawings is formed in the outer race 3, if the outer race 3 is ground using an existing grinding machine, generally the outer race 3 will be displaced by the grinding resistance and will not be able to be ground as expected.

Therefore, in this embodiment, the outer race 3 is somewhat extended at the lower end so as to be easy to grind. That is to say, the length to the broken line a corresponds to the ball receiving part 3a of the outer race 3 of the above described respective embodiments. This ball receiving surface 3a is of a concave surface of part circular cross section, whereas, in this embodiment, the ball receiving surface 3a''' is further extended at the lower end so as to be of a shape rather close to a semicircular cross section.

In such case, the outer race 3 is to be fitted around the balls 2 provided in the outer periphery of the groove 1a of the shaft 1 by applying a small force in assembling and is extended at the lower end so as not to obstruct the insertion of the balls in the ball receiving surface.

It is needless to say that, in case the insertion is obstructed, the obstructing part may be cut off and removed and the ball receiving surface 3a of the above described respective embodiments may be made.

This embodiment can be applied to the first to tenth embodiments and the later described embodiments.

By the way, it is preferable that, in case the contact points E and D of the ball 2 respectively with the shaft 1 and outer race 3 are on the straight line passing through the center of the ball 2, the ball 2 will not contact with the shaft 1 in the part C between them and will contact with the shaft 1 and outer race 3 respectively at one point.

FIG. 12 shows the twelfth embodiment of the present invention. In this embodiment, a pair of grooves 1a are formed on the outer periphery of the shaft 1 and the spacing between them is short and the sleeve for preventing the balls from dropping is not required so that the number of assembling parts may be decreased and the assemblability may be improved.

That is to say, in assembling, as shown in FIG. 12(1), first the shaft 1 is inserted into a hollow part provided with one outer race 3 at one end of the bearing housing 4 and is arranged in a proper position. Then, in the illustrated state, a proper number of the balls 2 are inserted from the lower side. In this case, a ball receiving jig 6' is used to prevent the balls 2 from dropping. The balls 2 will be supported by the rolling surfaces of the groove 1a and the ball receiving surface 3a of the outer race. The outer race 3 is to be fixed in a position for favorably holding the balls 2. Then, as shown in FIG. 12(2), the above mentioned assembly is turned upside down and a proper number of balls 2' are inserted between the bearing housing 4 and shaft 1 from the upper side.

Then, as shown in FIG. 12(3), the other outer race 3' is inserted into the bearing housing 4 and, as shown in FIG. 12(4), the balls 2' are supported by the ball receiving surface 3a' of this outer race 3' and the groove 1a' and the outer race 3' is fixed in a proper position so that a light, thin and short spindle unit may be assembled. That is to say, in the spindle unit of this invention, the distance between the grooves 1a and 1a' is short, no sleeve is required, the weight is reduced, the balls 2 and 2' are held directly by the shaft 1 and the outer races 3 and 3' provided on the outer periphery of the shaft 1 and therefore the assembly is narrow.

In use, the inner peripheral surfaces 3b and 3b' of the outer races 3 and 3' are so close to the outer periphery 1b of the shaft 1 that the entry of dust or the like into the ball parts can be prevented by the dust preventing clearance g of this fine gap. See FIG. 12(4). It is needless to say that this embodiment may be used not only as a spindle unit but also as a roller.

FIGS. 3(a) to (d) show the thirteenth embodiment of the present invention. In the rotary structure in each of the above described embodiments, the balls 2 are held by the groove 1a of a semicircular cross-section formed on the outer periphery of the shaft 1 and the ball receiving surface 3a of the outer race 3 provided within the bearing housing 4, the dust preventing clearance g is formed between the inner peripheral surface 3b of the outer race 3 and the outer peripheral surface 1b of the shaft 1 and the sleeve 5 is provided within the bearing housing 4 to prevent the balls 2 from dropping in assembling so that the cost may be reduced, the number of component parts may be decreased, the shape may be simplified, the assembly may be made easy, the size may be made small, the weight may be made light and the performance may be sufficient in practice.

However, in the rotary structure of the above mentioned construction the balls 2 arranged around the shaft 1 are generally intended to be full spheres and, in such case, there are problems that, above a medium speed rotation, the balls will collide with one another to make noise and develop mechanical loss.

Therefore, in this thirteenth embodiment, the noise generation and mechanical loss are reduced.

This embodiment is characterized in that a means for holding the balls at proper intervals with each other is provided so that the balls are separated from each other and do not collide with each other, noise generation and mechanical loss is controlled to a minimum and the sleeve 5 is made to function as a retainer.

This sleeve 5 can be formed of a resin such as, for example, DELULIN and, has the function of a retainer for holding the balls 2. The sleeve 5 has a number of semicircular grooves 5a larger than the ball 2 and corresponding to the number of the balls and the balls 2 are received in the respective grooves 5a and held at proper intervals in separated relations from each other.

In assembling, first of all, the sleeve 5 is fixed substantially in the middle of the bearing housing 4 and the shaft 1 is inserted into the sleeve 5. Then, a proper number of the balls 2 on the upper or lower side are put into the corresponding grooves 5a and are received by the ball receiving groove 1a of the shaft 1 and grease or oil is poured into that part. Then, the outer race 3 to be positioned on the opening side is put into the bearing housing 4 to press against the balls 2 with the ball receiving surface 3a and is fixed in a proper position on the inner peripheral surface of the bearing housing 4. The balls 2 and outer race 3 on the other side may be put in in the same manner and, in the case of using the rotary structure as a roller, the upper and lower flanges 6A and 7A may be fixed to the respective ends of the shaft 1. In the above mentioned assembling step, before the upper and lower flanges 6A and 7A are fixed, the rotation precision of the bearing housing 4 can be confirmed and, by finely adjusting the position of the outer race 3, the clearance with the balls 2 can be easily adjusted and a favorable rotation performance can be obtained. The inner peripheral surface 3b of the outer race 3 is so close to the outer peripheral surface 1b of the shaft 1 that, by the clearance g of this fine gap, the entry of dust or the like into the ball part can be minimized.

In the above, the sleeve 5 is fixed to the inner peripheral surface of the bearing housing 4 with a bonding agent or by press fit but may be fixed to the outer peripheral surface of the shaft and separated from the housing 4 to obtain the same function.

In this embodiment, the sleeve is made to have the function of a retainer, and hence no separate retainer is necessary and therefore the cost is that much lower.

Figure 14A:
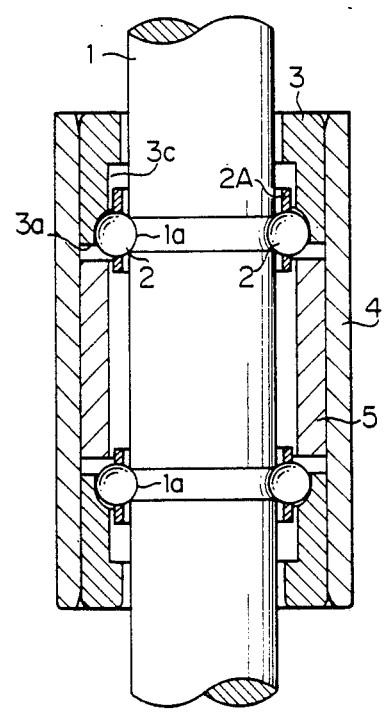
FIG. 14(a) is of similar view of the fourteenth embodiment of the present invention and FIG. 14(b) is an explanatory plan view showing balls as held at intervals by a retainer.
Figure 14B:
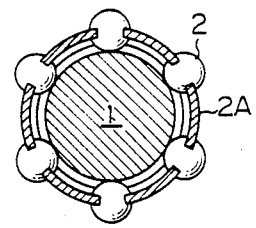

FIGS. 14(a) and (b) show the fourteenth embodiment of the present invention. This embodiment is different from the above described embodiment in that a means for holding the balls at proper intervals from each other is formed as a retainer 2A separately from the sleeve 5.

Therefore, the sleeve 5 is merely cylindrical and is provided on the inner peripheral surface of the bearing housing 4 and is not in contact with the respective members. The sleeve 5 serves to prevent the balls 2 held by the ring-shaped retainer 2A from dropping during assembling. A retainer accomodating recess 3c is formed in the outer race 3. The other construction is the same as in the thirteenth embodiment.

In assembling, first of all, a proper number of the balls 2 are mounted at intervals in the retainer 2A, for example, within a jig (not illustrated). This jig can have a magnetic force of attraction so that the balls 2 do not drop while being assembled.

On the other hand, the sleeve 5 is fixed by press-fit substantially in the middle of the bearing housing 4 and the shaft 1 is inserted into the sleeve 5. Then, the balls held at intervals by the retainer 2A on the upper or lower side are partly received in the groove 1a and grease or oil is poured into that part. Then, the outer race 3 to be positioned on that side is put into the bearing housing 4 through the opening so as to receive and press the balls 2 on the ball receiving surface 3a and the race 3 is fixed in a proper position on the inner peripheral surface of the bearing housing 4. Then, the balls 2 and outer race 3 on the other side are put in in the same manner.

Figure 15:
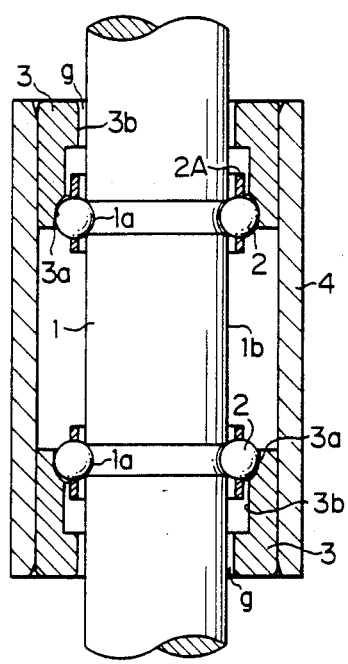
FIG. 15 is of similar view of the fifteenth embodiment of the present invention.

FIG. 15 shows the fifteenth embodiment of the present invention. In this embodiment, the sleeve 5 for preventing the balls 2 from dropping in the above described fourteenth embodiment is not required and the assembling is made that much easier.

Figure 16A:
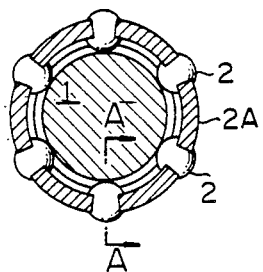
FIG. 16(a) is of similar view an explanatory plan view showing balls as incorporated in a retainer and provided around a shaft and FIG. 16(b) is a sectioned view on line A—A in FIG. 16(a).
Figure 16B:
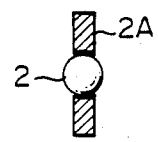
Figure 17:
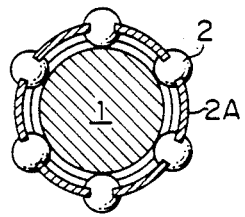
FIGS. 17 and 18 show respectively other embodiments of a retainer.
Figure 18:
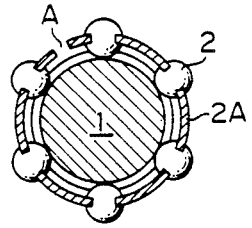

In this case, the retainer 2A is ring-shaped as shown particularly in FIGS. 16(a) and (b) and is made of a resilient material such as a resin or metal. The balls 2 are held through ball receiving parts provided at proper intervals and, in this case, consisting of holes of a diameter substantially equal to or somewhat smaller than the ball diameter. That is to say, in this retainer 2A, each ball 2 is forcibly put into the hole having such clearance from the ball 2 as prevents the ball 2 from being let out. The other construction of the retainer 2A may be as is shown in FIG. 17 or in FIG. 18 wherein the retainer 2 ring is made of a resilient member having a cut A enabling easy change in the inside diameter.

In assembling, as shown in FIG. 19(1), the retainer 2A in which the balls 2 are incorporated in advance is pushed onto the outer periphery of the shaft 1. In this case, the retainer 2A will be pushed to expand somewhat outward by the shaft 1 and the balls 2 in contact with the shaft 1. That is to say, the retainer 2A is of a diameter naturally larger than of the shaft 1 but will be pushed to expand somewhat outward in diameter against its resiliency when the balls 2 are fitted on the outer periphery of the shaft 1. As shown in FIG. 19(2), when the retainer 2A is pushed on and the balls 2 reach the groove 1a, the retainer 2A will contract and the balls 2 will be respectively fitted in the groove without dropping. Then, this assembly is inserted into the bearing housing 4 and the outer race 3 is inserted so that such rotary structure as a spindle unit may be assembled without using any sleeve.

In use, the inner peripheral surface 3b of the outer race 3 is so close to the outer peripheral surface 1b of the shaft 1 that the entry of dust or the like into the ball part can be prevented by the dust preventing clearance g of this fine gap so as to be a minimum. See FIG. 15.

Figure 20:
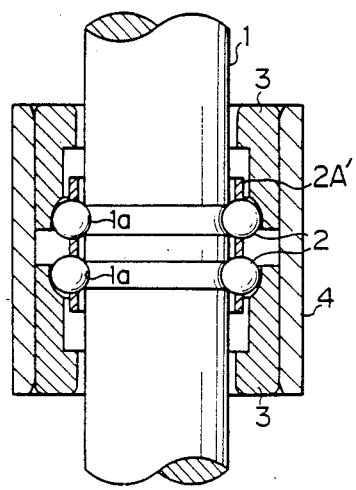
FIG. 20 is of similar view of the sixteenth embodiment of the present invention.
Figure 22:
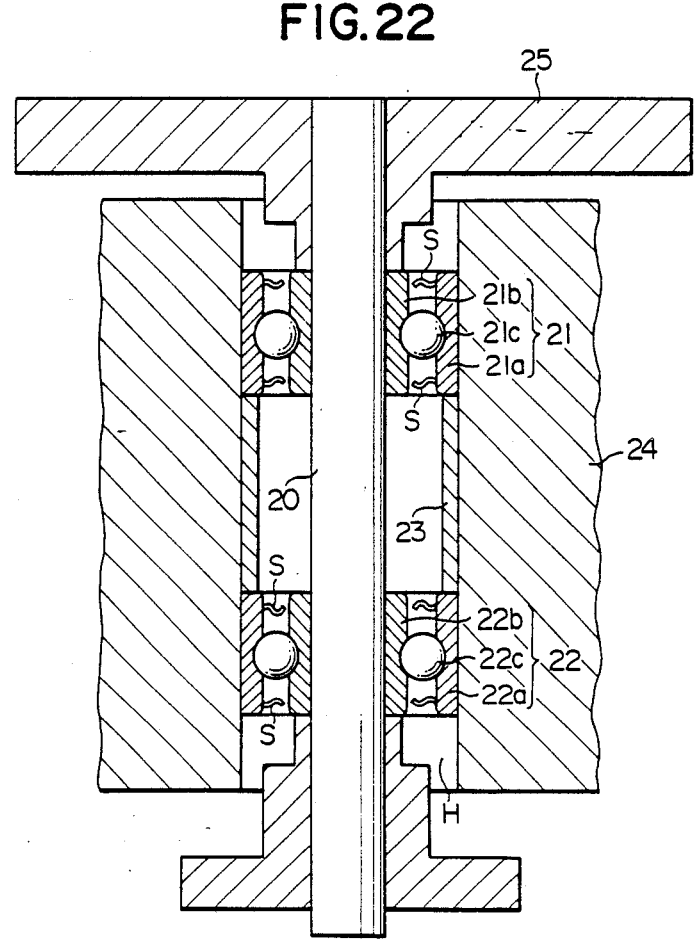
FIG. 22 shows a prior art embodiment.

FIG. 20 shows the sixteenth embodiment of the present invention. This embodiment is characterized in that the distance between the pair of grooves 1a formed on the outer periphery of the shaft 1 is small and a retainer 2A' is provided with two rows of balls 2 corresponding to the pair of grooves 1. The basic material and formation of the retainer 2A' are the same as in the above described embodiments.

In assembling, as shown in FIG. 21(1), first of all, the balls 2 incorporated in the retainer 2A' are fitted on the outer periphery of the shaft 1 and are pushed toward the ball receiving parts 1a as indicated by the arrow.

Then, as shown in FIG. 21(2), when the balls 2 located on the lower side in the drawing first reach the groove 1a on the upper side, the balls 2 will fit into the groove 1a due to the resiliency of the retainer 2A'. At this time, the ball part on the upper side will remain pushed to expand outward.

Then, when the balls are further pushed in, as shown in FIG. 21(3), the balls in the upper and lower rows will respectively fit into the grooves 1a so as to be fitted on the outer periphery of the shaft 1.

As in the above, according to the present invention, without using a radial ball bearing, a ball receiving groove of a semicircular cross-section is formed on a shaft, balls are held by the ball rolling surfaces of this groove and the ball receiving surface of an outer race provided on the inner peripheral surface of a bearing housing, no expensive radial ball bearing of a double sealing structure is required and the cost can be that much reduced.

The minimum component parts around the shaft are the balls, outer race, sleeve provided as required and bearing housing and the component parts are decreased in number to be fewer than before and are simple in shape, easy to make, low in cost and easy to assemble.

The balls are partly contained in the ball receiving groove on the shaft, therefore they can be made small and the number of the component parts is so small that the weight can be reduced.

In case the contour is the same as in the past, the ball diameter can be made that much larger and therefore the rigidity can be improved.

In the conventional radial ball bearing, in order to provide a precise clearance between the inner race and outer race, the dimensions of the outside diameter of the inner race and the inside diameter of the outer race had to be precise in order to provide a proper clearance with respect to the balls but, in the present invention, such correspondence is unnecessary, in that if the position of the outer race is displaced, the diameter of the balls can be made somewhat larger and, in this respect, too, the rigidity can be improved.

Further, in assembling, by finely adjusting the position of the outer race, the clearance can be freely and easily adjusted.

What is claimed is:

1. A rotary structure for a VCR or floppy disc comprising a shaft having an outer periphery with an annular groove of substantially semi-circular cross-section therein, a ball engaging element around said shaft and having an end adjacent to said groove, an outer race comprising a ring surrounding said shaft and having an inner surface facing said shaft which is provided with a concave ball receiving groove therein of part circular cross-section, a plurality of spherical balls partly received in said annular groove in said shaft and projecting therefrom, said concave surface of said outer race being in contact with said balls to hold said balls rotatably in said annular groove in said shaft and in said ball-receiving groove in said outer race, and a bearing housing surrounding said outer race and fixedly supporting the same, said outer race having an end facing said end of said ball engaging element in spaced relation, said concave ball-receiving groove in said outer race extending to said end of said outer race, the spacing between said end of the outer race and said end of the ball engaging element being such that said ball engaging element can support said balls when freely inserted in said bearing housing during assembly and enable said outer race to engage said balls and urge the same away from said ball engaging element and into said groove in said shaft, said housing having an open end in which said shaft is inserted, said end of said outer race facing inwardly into said housing in a direction away from said open end, said end of said ball engaging element facing in the direction towards said open end of said housing, said ball engaging element being fixed in said housing and said outer race being located between said ball engaging element and said open end of the housing, said end of said ball engaging member having a plurality of grooves receiving respective balls to hold the balls in spaced separated relation.

2. A rotary structure as claimed in claim 1 wherein one of said shaft and housing is fixed and the other is rotatable.

3. A rotary structure as claimed in claim 1 comprising means by which said outer race applies resilient force to said balls.

4. A rotary structure as claimed in claim 1 wherein said end of said outer race is located radially outside said groove in said shaft.

* * * * *